United States Patent
Fujii et al.

(10) Patent No.: US 8,065,523 B2
(45) Date of Patent: Nov. 22, 2011

(54) EXTERNAL STORAGE APPARATUS AND METHOD OF PREVENTING INFORMATION LEAKAGE

(75) Inventors: Kenji Fujii, Yokohama (JP); Daisuke Kito, Machida (JP); Manabu Kitamura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 945 days.

(21) Appl. No.: 12/007,460

(22) Filed: Jan. 10, 2008

(65) Prior Publication Data

US 2009/0271619 A1    Oct. 29, 2009

(30) Foreign Application Priority Data

Apr. 18, 2007  (JP) ................. 2007-108835

(51) Int. Cl.
*G06F 12/14* (2006.01)
*H04L 29/06* (2006.01)
*H04L 9/00* (2006.01)
(52) U.S. Cl. .................. 713/165; 713/193; 380/277
(58) Field of Classification Search .................. None
See application file for complete search history.

(56) References Cited

U.S. PATENT DOCUMENTS

| | | | |
|---|---|---|---|
| 5,412,721 A * | 5/1995 | Rager et al. | 380/273 |
| 6,480,096 B1 * | 11/2002 | Gutman et al. | 340/5.31 |
| 6,591,251 B1 | 7/2003 | Leon et al. | |
| 7,809,934 B2 * | 10/2010 | Conti et al. | 713/1 |
| 2002/0188866 A1 | 12/2002 | Ca et al. | |
| 2009/0119785 A1 * | 5/2009 | Challener et al. | 726/34 |

FOREIGN PATENT DOCUMENTS

| | | |
|---|---|---|
| EP | 0 740 037 A1 | 4/1995 |
| EP | 1 441 275 A1 | 1/2003 |
| EP | 1441275 A1 | 7/2004 |
| JP | 2004-280551 A | 10/2004 |
| WO | WO 98/04967 | 2/1998 |
| WO | 2000/17731 A1 | 3/2000 |
| WO | WO 00/17731 | 3/2000 |
| WO | WO 2005/001673 A1 | 1/2005 |

OTHER PUBLICATIONS

"Security Requirements for Cryptographic Modules", National Institute of Standards and Technology (NIST), FIPS PUB. 140-2, issued May 25, 2001, pp. i-viii and 1-61.
Partial European Search Report regarding European Application No. 08250171.9-2212 dated Jul. 24, 2008.

* cited by examiner

*Primary Examiner* — Nasser Moazzami
*Assistant Examiner* — Fatoumata Traore
(74) *Attorney, Agent, or Firm* — Volpe and Koenig, P.C.

(57) ABSTRACT

Proposed is an apparatus and method of preventing the leakage of information from an external storage apparatus even when such external storage apparatus is stolen or accessed from an unauthorized host computer. This external storage apparatus accessible from a host computer or another external storage apparatus via a network encrypts or decrypts data written from a host computer to be stored in the storage area, sends a request for existence confirmation to the host computer or the other external storage apparatus every predetermined period of time, and zeroizes an encryption key to be used in the encryption calculation for encrypting or decrypting data to be performed by the encryption calculation unit based on the result of a response from the host computer or the other external storage apparatus in reply to the request.

20 Claims, 12 Drawing Sheets

FIG.3

| # | APPARATUS NAME | TYPE | WWN | INSTALLATION SITE |
|---|---|---|---|---|
| | PATH MANAGEMENT TABLE | | | |
| 1 | HOST 1 | HOST COMPUTER | 0xAABBCCDD | SERVER ROOM 1 |
| 2 | HOST 2 | HOST COMPUTER | 0xAABBEEFF | SERVER ROOM 1 |
| 3 | STORAGE 2 | EXTERNAL STORAGE APPARATUS | 0xCCDDEEFF | SERVER ROOM 1 |
| 4 | STORAGE 3 | EXTERNAL STORAGE APPARATUS | 0xCCDDAABB | SERVER ROOM 2 (REMOTE SITE) |
| 5 | ... | ... | ... | ... |

| | POLICY TABLE | |
|---|---|---|
| # | POLICY | EFFECTIVENESS |
| 1 | •ZEROIZE KEY OF EXTERNAL STORAGE APPARATUS WHEN RESPONSE TO EXISTENCE CONFIRMATION IS NOT RETURNED FROM AT LEAST ONE HOST COMPUTER OR EXTERNAL STORAGE APPARATUS<br><br>•WHEN ZEROIZING KEY OF SELF-EXTERNAL STORAGE APPARATUS, ZEROIZE KEYS OF ALL OTHER EXTERNAL STORAGE APPARATUSES | ○ |
| 2 | •ZEROIZE KEY OF EXTERNAL STORAGE APPARATUS WHEN RESPONSE TO EXISTENCE CONFIRMATION IS NOT RETURNED FROM AT LEAST ONE HOST COMPUTER OR EXTERNAL STORAGE APPARATUS<br><br>•WHEN ZEROIZING KEY OF SELF-EXTERNAL STORAGE APPARATUS, ONLY ZEROIZE KEYS OF ALL OTHER EXTERNAL STORAGE APPARATUSES INSTALLED AT THE SAME SITE (DO NOT ZEROIZE OTHER EXTERNAL APPARATUSES INSTALLED AT DIFFERENT LOCATIONS) | × |
| 3 | •ZEROIZE KEY OF EXTERNAL STORAGE APPARATUS WHEN RESPONSE TO EXISTENCE CONFIRMATION IS NOT RETURNED FROM AT LEAST TWO HOST COMPUTERS OR EXTERNAL STORAGE APPARATUSES<br><br>•WHEN ZEROIZING KEY OF SELF-EXTERNAL STORAGE APPARATUS, ZEROIZE KEYS OF ALL OTHER EXTERNAL STORAGE APPARATUSES | × |
| 4 | •ZEROIZE KEY OF EXTERNAL STORAGE APPARATUS WHEN RESPONSE TO EXISTENCE CONFIRMATION IS NOT RETURNED FROM AT LEAST TWO HOST COMPUTERS OR EXTERNAL STORAGE APPARATUSES<br><br>• WHEN ZEROIZING KEY OF SELF-EXTERNAL STORAGE APPARATUS, ONLY ZEROIZE KEYS OF ALL OTHER EXTERNAL STORAGE APPARATUSES INSTALLED AT THE SAME SITE (DO NOT ZEROIZE OTHER EXTERNAL APPARATUSES INSTALLED AT DIFFERENT LOCATIONS) | × |
| 5 | ... | |

1171　　　　1172　　　　1173

EXTERNAL STORAGE APPARATUS AND METHOD OF PREVENTING INFORMATION LEAKAGE

CROSS REFERENCES

This application relates to and claims priority from Japanese Patent Application No. 2007-108835, filed on Apr. 18, 2007, the entire disclosure of which is incorporated herein by reference.

BACKGROUND

The present invention generally relates to an external storage apparatus for storing data of a computer system, and in particular is suitable for application in technology of preventing the leakage of information from an external storage apparatus when such external storage apparatus is stolen or reading of data is attempted from an unauthorized host computer.

Pursuant to the increase in the amount of digital data retained by corporations, computer systems that connect a host computer and an external storage apparatus or the like via a network (primarily a fibre channel) dedicated to a storage apparatus are becoming common.

Conventionally, with a computer system installed in a data center or the like, it was standard for an external storage apparatus to have a large chassis, and be installed in a physically remote server room in which the entrance and exit into and from the server room is managed. Thus, it was unlikely that the external storage apparatus would be stolen. In recent years, however, pursuant to the enlarged capacity of HDDs, the miniaturization and portability of external storage apparatuses have been advanced, and the risk of an external storage apparatus being stolen is increasing due to the growing incidence of crimes committed by administrators.

Thus, technology has been proposed for preventing the leakage of information from an external storage apparatus even when such external storage apparatus is stolen. For example, National Institute of Standards and Technology (NIST), FIPS PUB 140-2, "Security Requirements for Cryptographic Modules," issued May 25, 2001, describes zeroing the encryption key or the like of a plain text when the maintenance interface of an encryption module is accessed as a physical security requirement in the encryption module to prevent the recovery of encrypted data.

SUMMARY

If the conventional technology of Non-Patent Document 1 is applied to an external storage apparatus, it will be possible to prevent the leakage of information from the external storage apparatus by encrypting storing data of the external storage apparatus, and zeroing the encryption key when the theft of the external storage apparatus is detected.

Nevertheless, with the conventional technology described in Non-Patent Document 1, no reference is made to the means for detecting the theft of the external storage apparatus upon zeroing the encryption key, or to the restoration of the key when the encryption key is erroneously zeroized. In addition, even when the external storage apparatus is not stolen, when an unauthorized host computer masquerades as the legitimate host computer and accesses the external storage apparatus, since the encryption key will not be zeroized with the conventional technology, there is a possibility that the data stored in the external storage apparatus will be decrypted and divulged from the external storage apparatus.

The present invention was devised in view of the foregoing points. Thus, an object of the present invention is to propose an external storage apparatus and an information leakage prevention method capable of preventing the leakage of information from an external storage apparatus even when such external storage apparatus is stolen or accessed from an unauthorized host computer in a computer system configured from a host computer and an external storage apparatus or the like.

In order to achieve the foregoing object, the present invention provides an external storage apparatus accessible from a host computer or another external storage apparatus via a network. This external storage apparatus comprises a storage area for storing data written from a host computer, an encryption calculation unit for encrypting or decrypting data stored in the storage area, a transmission unit for sending a request for existence confirmation to the host computer or the other external storage apparatus every predetermined period of time, and a key management unit for zeroizing an encryption key to be used in the encryption calculation for encrypting or decrypting data to be performed by the encryption calculation unit based on the result of a response from the host computer or the other external storage apparatus in reply to the request.

Thus, it is possible to prevent the leakage of information from an external storage apparatus by encrypting or decrypting data written from a host computer to be stored in the storage area of an external storage apparatus accessible from a host computer or another external storage apparatus via a network, sending a request for existence confirmation to the host computer or the other external storage apparatus every predetermined period of time, and zeroing an encryption key to be used in the encryption calculation for encrypting or decrypting data to be performed by the encryption calculation unit based on the result of a response from the host computer or the other external storage apparatus in reply to the request.

For example, the transmission unit sends the request based on the difference of whether the timing of a data I/O request from the host computer is a sequential access or a random access. Further, when the timing of a data I/O request from the host computer is a random access, the transmission unit shortens the predetermined period of time for sending the request. Moreover, when the encryption key is zeroized, the key management unit sends information for zeroing an encryption key in another external storage apparatus to the other external storage apparatus. In addition, the external storage apparatus further comprises an acquisition unit for acquiring the number of people in an area to which the external storage apparatus is installed, and the transmission unit decides the timing of sending the request based on the number of people acquired with the acquisition unit.

The present invention further provides an external storage apparatus accessible from a host computer or another external storage apparatus via a network. This external storage apparatus comprises a storage area for storing data written from a host computer, an encryption calculation unit for encrypting or decrypting data stored in the storage area, a computation unit for computing a sequence number corresponding to individual I/O requests from the host computer, a verification unit for verifying the sequence number sent from the host computer and the sequence number computed with the computation unit, and a key management unit for zeroing an encryption key to be used in the encryption calculation for encrypting or decrypting data when the sent sequence number and the computed sequence number do not match based on the verification result of the verification unit.

Thus, it is possible to prevent the leakage of information from an external storage apparatus by encrypting or decrypting data written from a host computer to be stored in the storage area of an external storage apparatus accessible from a host computer or another external storage apparatus via a network, computing a sequence number corresponding to individual I/O requests from the host computer, verifying the sequence number sent from the host computer and the sequence number computed with the computation unit, and zeroizing an encryption key to be used in the encryption calculation for encrypting or decrypting data when the sent sequence number and the computed sequence number do not match based on the verification result at the verification step.

For example, the sequence number corresponding to individual I/O requests from the host computer is configured from random numbers or character strings. Further, when the encryption key is zeroized, the key management unit sends information for zeroizing an encryption key in another external storage apparatus to the other external storage apparatus.

The present invention further provides an external storage apparatus accessible from a host computer or another external storage apparatus via a network. This external storage apparatus comprises a storage area for storing data written from a host computer, an encryption calculation unit for encrypting or decrypting data stored in the storage area, and a volatile memory for storing the encryption key to be used in the encryption calculation for encrypting or decrypting data to be performed by the encryption calculation unit, and zeroizing the stored encryption key when the supply of external power source is cut off.

Thus, it is possible to prevent the leakage of information from an external storage apparatus by encrypting or decrypting data written from a host computer to be stored in the storage area of an external storage apparatus accessible from a host computer or another external storage apparatus via a network, and zeroizing an encryption key to be used in the encryption calculation for encrypting or decrypting data based on the result of a response from the host computer or the other external storage apparatus in reply to the request.

The present invention further provides an external storage apparatus accessible from a host computer or another external storage apparatus via a network. This external storage apparatus comprises a storage area for storing data written from a host computer, an encryption calculation unit for encrypting or decrypting data stored in the storage area, a reader device for reading an encryption key from a storage medium storing the encryption key to be used in the encryption calculation for encrypting or decrypting data to be performed by the encryption calculation unit, and a controller for disallowing the use of the encryption key when the reader device is inserted into the storage medium.

Thus, it is possible to prevent the leakage of information from an external storage apparatus by comprising a storage area for storing data written from a host computer, an encryption calculation unit for encrypting or decrypting data stored in the storage area, a reader device for reading an encryption key from a storage medium storing the encryption key to be used in the encryption calculation for encrypting or decrypting data to be performed by the encryption calculation unit, and a controller for disallowing the use of the encryption key when the reader device is inserted into the storage medium.

In other words, according to the foregoing external storage apparatus, it will be possible to detect the connection status of the external storage apparatus and the host computer, and detect the data I/O from an unauthorized host computer. In such a case, it will be possible to prevent the leakage of information from the external storage apparatus by zeroizing the encryption key.

The present invention is thereby able to provide an external storage apparatus and an information leakage prevention method capable of preventing the leakage of information from an external storage apparatus even when such external storage apparatus is stolen or accessed from an unauthorized host computer in a computer system configured from a host computer and an external storage apparatus or the like.

DESCRIPTION OF DRAWINGS

FIG. 3 is a diagram showing an example of a path management table retained in the external storage apparatus according to an embodiment of the present invention;

FIG. 10 is a diagram showing an example of a policy table retained by the external storage apparatus according to an embodiment of the present invention;

DETAILED DESCRIPTION

Embodiments of the present invention are now explained in detail with reference to the attached drawings. Incidentally, the present invention shall not be limited in any way by the following embodiment.

Figure 1:
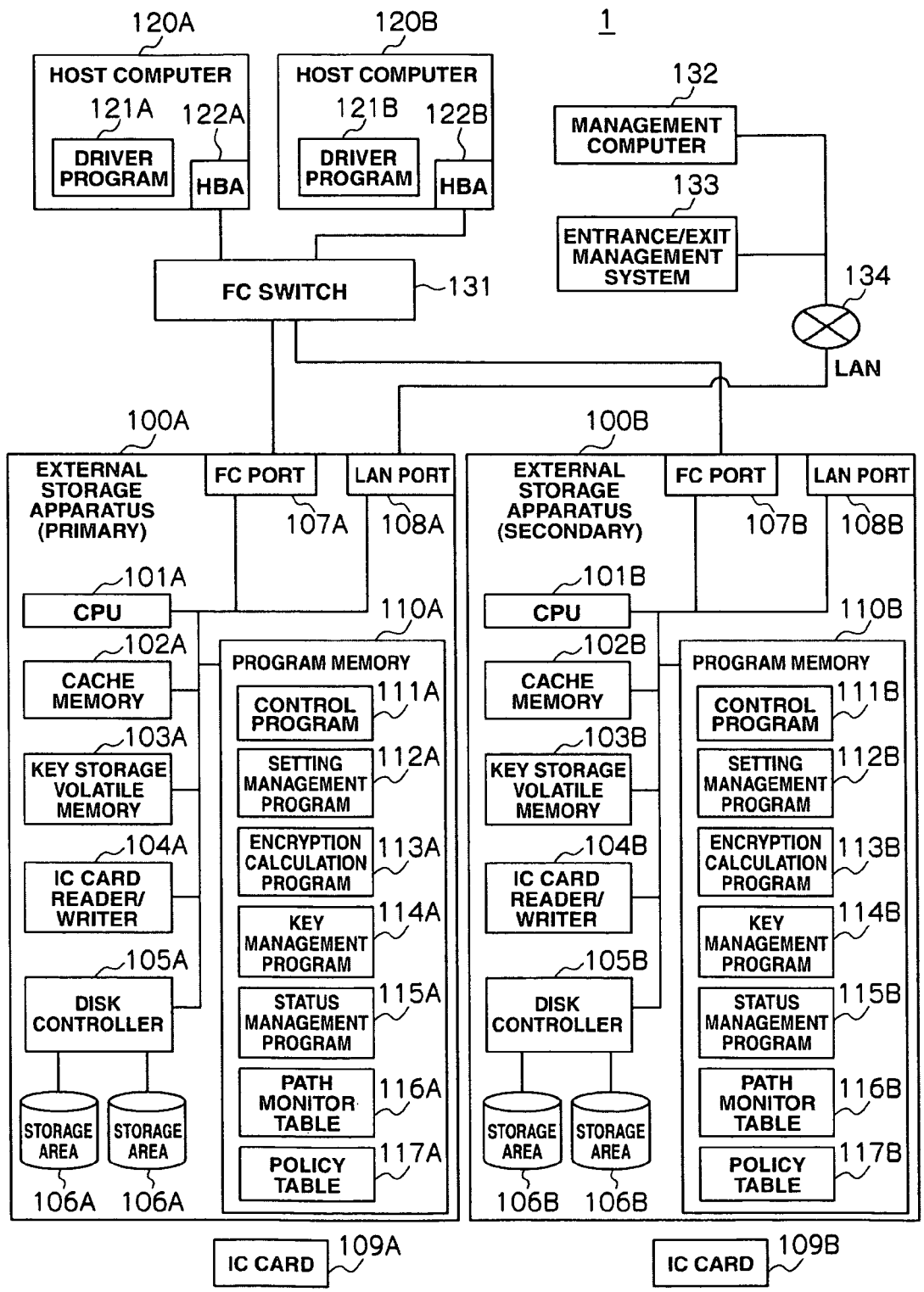
FIG. 1 is a diagram showing a system configuration example of a computer system according to an embodiment of the present invention.

FIG. 1 shows a system configuration example of a computer system 1 according to an embodiment of the present invention. As shown in FIG. 1, the computer system 1 comprises host computers 120A, 120B, external storage apparatuses 100A, 100B, a management computer 132, and an entrance/exit management system 133.

Although not illustrated in FIG. 1, let it be assumed that the computer system 1 is installed in a physically remote server room where entrance and exit into and from the server room is managed. The host computers 120A, 120B and the external storage apparatuses 100A, 100B are mutually connected with a storage-dedicated network via an FC (fibre channel) switch 131. The management computer 132, the entrance/exit management system 133, and the external storage apparatuses 100A, 100B are mutually connected via a LAN 134.

The host computer 120A is a computer that requests data I/O to the external storage apparatuses 100A, 100B, and comprises a driver program 121A for performing processing in coordination with the external storage apparatuses 100A, 100B, an HBA (host bus adapter) 122A, an application program (not shown) and the like.

The HBA 122A has a unique WWN (World Wide Name). Incidentally, the host computer 120B is configured the same as the host computer 120A, and the explanation thereof is omitted. Further, when there is no need to specifically differentiate the host computers 120A, 120B, the symbols A and B will be removed from the identification numbers of the host computers and their constitutional elements, and be represented as a host computer 120, a driver program 121, and so on.

Figure 11:
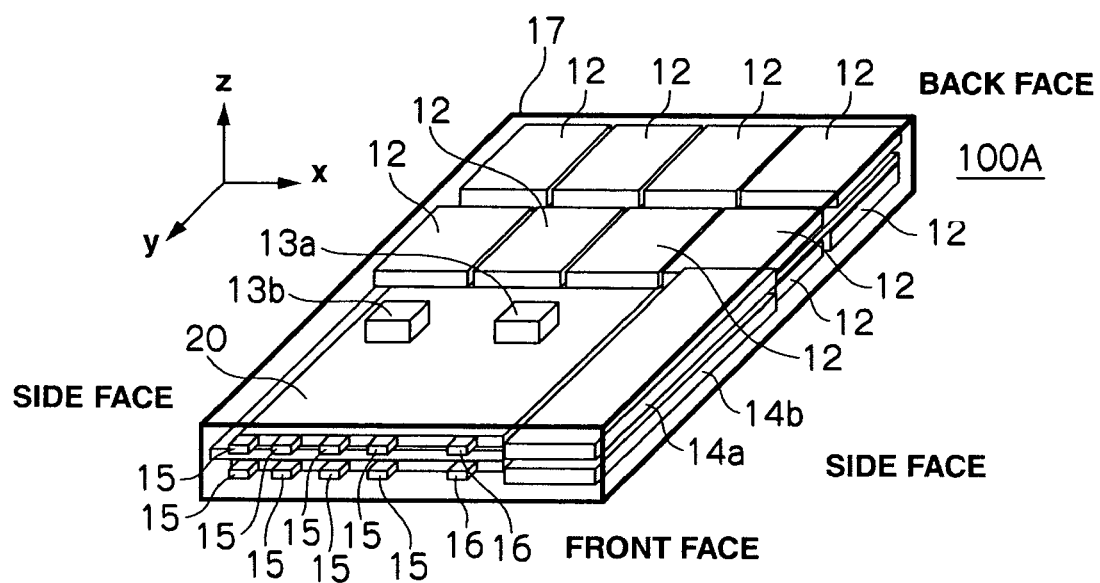
FIG. 11 is a diagram showing the appearance and configuration of the external storage apparatus according to an embodiment of the present invention.
Figure 12:
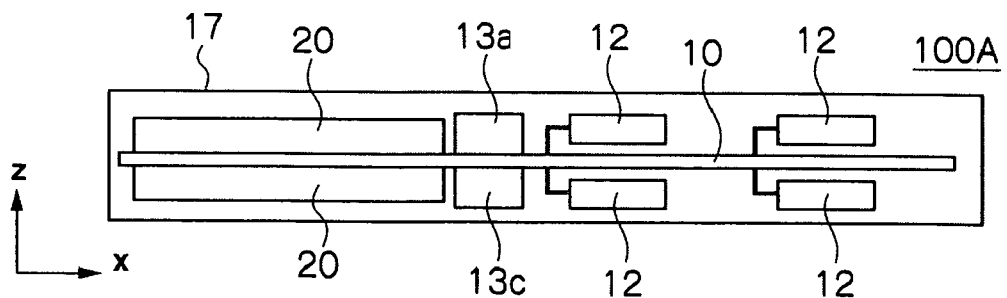
FIG. 12 is a diagram showing the appearance and configuration of the external storage apparatus according to an embodiment of the present invention.
Figure 13:
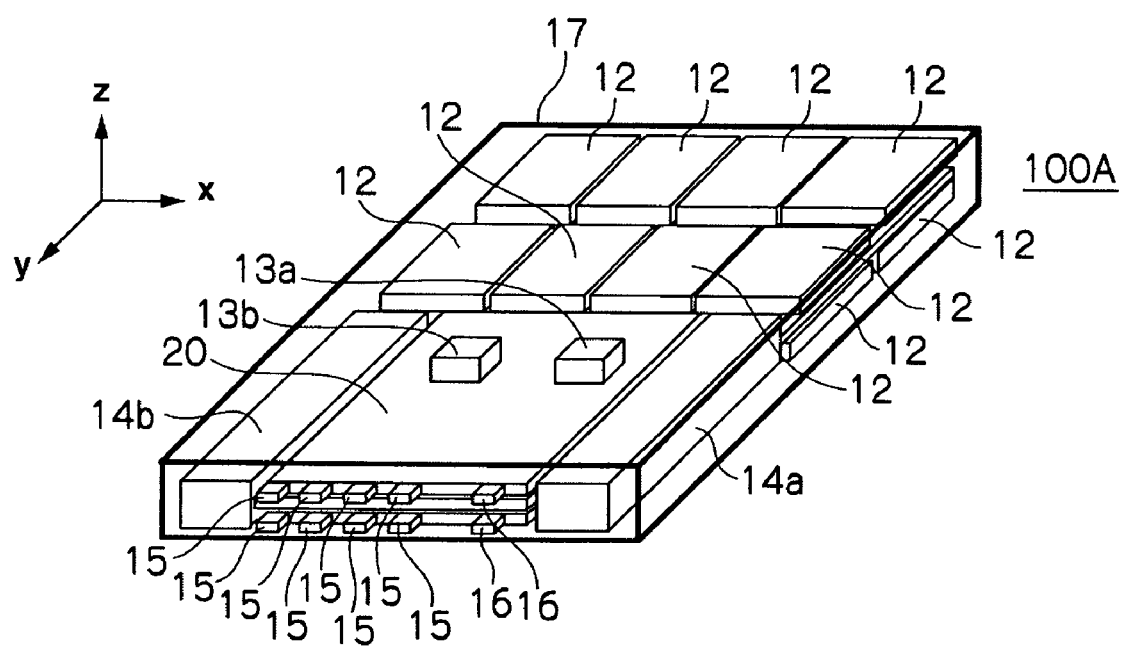
FIG. 13 is a diagram showing the appearance and configuration of the external storage apparatus according to an embodiment of the present invention.

FIG. 11 to FIG. 13 show the appearance and configuration of the external storage apparatus 100A. FIG. 11 is a cubic diagram, and FIG. 12 is a cross section of the external storage apparatus 100A illustrated in FIG. 11. Further, FIG. 13 is a diagram showing the configuring after changing the arrangement of the power source unit in the external storage apparatus 100A illustrated in FIG. 11. Incidentally, the external storage apparatus 100B also has the same appearance and configuration, and the illustration and explanation thereof are omitted.

The external storage apparatus 100 has an HDD 12, fans 13a, 13b, power source units 14a, 14b, a controller 20, a host computer port 15, and an external storage apparatus port 16, and these components are covered with a chassis 17. Incidentally, the chassis 17 shall be configured so that the parts cannot be replaced easily, but does not necessarily have to realize a hermetically-sealed state. The chassis 17 has portions to be connected to other devices, switches and the like for operation, air hatches for cooling, and so on. As a result of adopting a configuration so that the parts cannot be replaced easily, for instance, it is possible to prevent the erroneous connection of a nonstandard HDD. Further, by avoiding the premise of parts replacement, the freedom of arranging parts will increase, and the loading density of parts can also be increased in comparison to conventional technology. Incidentally, the HDD 12 will be used as a storage area 106 described later.

FIG. 12 is a cross section of the external storage apparatus 100A having a configuration where the controller 20, the fan 13a, the HDD 12, and the HDD 12 are mounted on either side of the substrate 10 in that order from the front face to the back face. In order to miniaturize the external storage apparatus 100A, the HDDs 12 are arranged horizontally, and the HDDs 12 are arranged in two rows from the front face to the back face so as to gain capacity.

Meanwhile, as shown in FIG. 11, when the HDDs 12 are arranged horizontally and four HDDs 12 are arranged in the X direction, this will be roughly the same as the standard size of aligning 3.5-inch HDDs vertically in the x direction. Thus, a rack that was previously used to house the external storage apparatus 100A can be used.

The fans 13 can also be arranged at a location with favorable cooling efficiency, and the cooling efficiency can be improved thereby. With the external storage apparatus 100A, as shown in FIG. 12, the fans are provided between the controller 20 and the HDD 12, and the heat from the controller 20 is sent to the HDD side.

Incidentally, a dust-prevention effect is yielded by covering these components with the chassis 17, and this will also lower the percentage of a failure occurring in the respective components. The power source unit 14, as shown in FIG. 11, is mounted with two power source units 14a, 14b. Among these two power source units 14a, 14b, the power source unit 14a arranged on the upper side (plus Z direction) supplies power to the controller 20, the fan 13a and the HDD 12 at the upper part of the substrate 10 shown in FIG. 12, and the power source unit 14b arranged on the lower side (minus Z direction) supplies power to the controller 20, the fan 13c and the HDD 12 arranged at the lower part of the substrate 10. Further, the two power source units 14 are respectively connected to the controllers 20, the fans 13 and the HDDs 12 at both the upper side and lower side of the substrate 10, and, when a failure occurs in one of the power source units 14, the other power source unit 14 supplies power to all controllers 20, fans 13, and HDDs 12.

The power source units 14, in addition to the configuration of being arranged side-by-side in the vertical direction (z direction) as shown in FIG. 11, may also be arranged side-by-side in the anteroposterior direction (x direction), or may be arranged as shown in FIG. 13. By adopting the arrangement depicted in FIG. 11 and FIG. 13, the arrangement of the components on the upper side and the arrangement of the components on the lower side will become a symmetrical configuration, and the fans 13a, 13b arranged symmetrically in the vertical direction will be able to cool both the upper and lower sides simultaneously, and the cooling efficiency can be improved by using these fans 13a, 13b. Further, by adopting this vertically symmetrical configuration, the design and manufactured can be simplified. Meanwhile, when the vertical direction of the power source unit 14 is similar to the size when arranging two 3.5-inch HDDs 12 vertically as shown in FIG. 11, and the measurement of the anteroposterior direction (x direction) is roughly half the measurement of the anteroposterior direction of a standard controller 20, the power source units 14 can be arranged in the anteroposterior direction (x direction) so as to miniaturize the external storage apparatus.

The external storage apparatus 100A configured as described above is a storage apparatus for inputting and outputting data according to requests from the host computers 120A, 120B, and comprises a CPU 101A, a cache memory 102A, a key storage volatile memory 103A, an IC card reader/writer 104A, a disk controller 105A, a storage area 106A, an FC port 107A, a LAN port 108A, an IC card 109A and a program memory 110A. Incidentally, all of these elements are contained in the controller 20.

The CPU 101A is a central processing unit for controlling the operation of the overall external storage apparatus 100A, and executing prescribed processing according to the various programs stored in the program memory 110. The cache memory 102A is a temporary storage area for speeding up the input and output of data to and from the storage area 106A. The key storage volatile memory 103A is a temporary storage area for storing key information to be used in the encryption calculation of data, and is mounted with a volatile memory that loses its memory content when the supply of the power source is cut off. The IC card reader/writer 104A is an IC card reader/writer device for reading and writing data from and into the IC card 109A. The disk controller 105A is a processing device for controlling the input and output of data to and from the storage area 106A. The storage area 106A is a physical disk drive for storing data from the host computers 120A, 120B. The FC port 107A is an interface for communicating with the host computers 120A, 120B and the other external storage apparatus 100B via a storage-dedicated network, and the FC port has a unique WWN (World Wide Name). The LAN port 108A is an interface for communicating with the management computer 132, the entrance/exit management system 133 and the other external storage apparatus 100B via the LAN 134. The IC card 109A is an IC card for storing key information to be used in the encryption calculation of data of the external storage apparatus 100A. The program memory 110A is a storage area for storing program 111A to 115A that execute various types of processing of the external storage apparatus 100A, and tables 116A, 117A.

The control program 111A is a program for controlling the input and output of data to and from the cache memory 102A, storage area 106A and the like according to a data I/O request from the host computer 120. The setting management program 112A is a program for setting information required in the processing of the external storage apparatus 100A and notifying a necessary response or a message according to the setting and operation request from the management computer 132. The encryption calculation program 113A is a program for calculating the encryption and decryption of data stored in the storage area 106, and, for instance, is mounted with a common key encryption-type AES (Advanced Encryption Standard). The key management program 114A is a program for managing the encryption key information to be used by the encryption calculation program 113A, and zeroizing the encryption key (i.e., clearing or invalidating the encryption key) as necessary. The status management program 115A is a program for confirming the connection status of the respective devices in the computer system 1, confirming the validity of the data I/O request from the host computer 120A, and confirming the status of the IC card reader/writer 104A.

The path management table 116A is a table for managing information such as the device name, type (host computer/external storage apparatus), WWN and installation site as the path information of devices such as the host computer 120 and the other external storage apparatus 100B configuring the computer system 1. The policy table 117A is a table for managing information such as the conditions for zeroizing the encryption key in the external storage apparatus described later, and the scope of zeroizing the encryption of the other external storage apparatus in coordination with the zeroization of the encryption key of the external storage apparatus.

The external storage apparatus 100B is configured the same as the external storage apparatus 100A, and the explanation thereof is omitted. Further, when it is not necessary to specifically differentiate the external storage apparatuses 100A, 100B, the symbols A and B will be removed from the identification numbers of the external storage apparatuses and their constitutional elements, and be represented as an external storage apparatus 100, a host computer 110, a program memory 120, and so on.

The management computer 132 is a computer for sending setting and operation requests to the external storage apparatuses 100A, 100B and displaying messages from the external storage apparatus 100. In this embodiment of the present invention, although a common management computer 132 is provided for managing the external storage apparatuses 100A, 100B, in substitute for the management computer 132, a management console terminal dedicated respectively to the external storage apparatuses 100A, 100B for performing similar processing as the management computer 132 may also be used.

The entrance/exit management system 133 is a system for managing the entrance and exit of people in and out of the physically isolated server room in which the computer system is installed, and notifies the external storage apparatus 100 of the total number of people in the server room whenever there is an increase or decrease in the number of people in the server room.

In this embodiment of the present invention, the following processing of (1) to (4) are realized in the external storage apparatus 100 by the CPU 101 executing the various programs 111 to 115 in the program memory 110, and it is thereby possible to prevent the leakage of information from the external storage apparatus 100A.

(1) Registration of path information of each device configuring the computer system;
(2) Registration of encryption key information;
(3) Encryption/decryption of stored data; and
(4) Zeroization of encryption key upon detection of abnormal status.

The method of realizing processing (1) to processing (4) is now explained with reference to FIG. 2 to FIG. 10.

Figure 2:
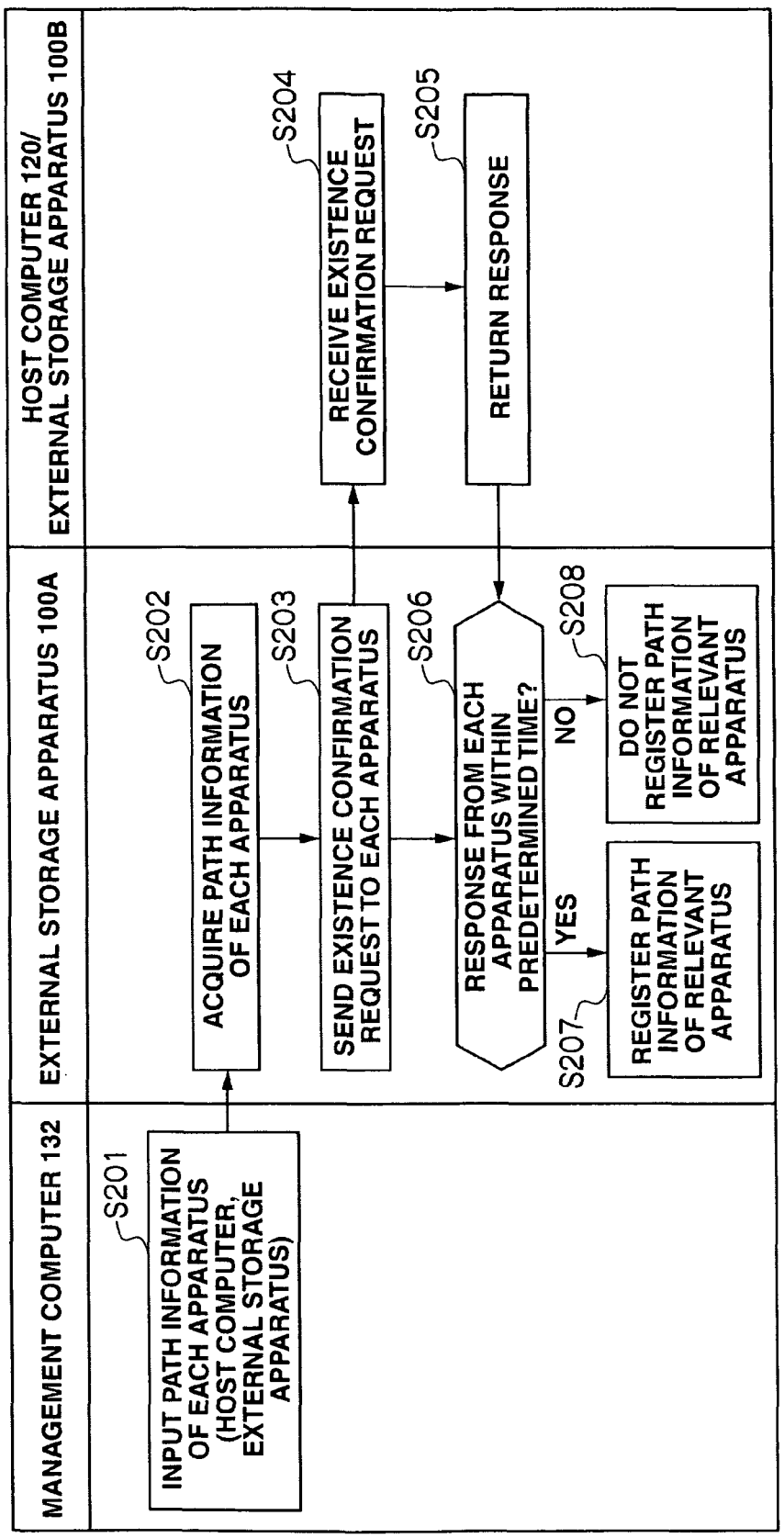
FIG. 2 is a flowchart showing the processing for registering the path information of each device to be performed in an external storage apparatus according to an embodiment of the present invention.

Foremost, processing (1) of registering path information of devices such as the host computer 120 and the external storage apparatus 100B configuring the computer system 1 to be performed in the external storage apparatus 100A is explained with reference to FIG. 2. FIG. 2 is a flowchart showing the processing to be executed by the setting management program 112A and the status monitoring program 115A for registering the path information of each device.

At step S201, an administrator of the computer system 1 uses the management computer 132 to input the device name, type (host computer/external storage apparatus), WWN and installation site of each device as the path information of the host computer 120 and the other external storage apparatus 100B configuring the computer system 1. The management computer 132 sends the path information of the host computer 120 and the external storage apparatus 100B input by the administrator to the external storage apparatus 100A.

At step S202, the setting management program 112A of the external storage apparatus 100A acquires the path information of the host computer 120 and the external storage apparatus 100B. At step S203, the status management program 115A of the external storage apparatus 100A sends an existence confirmation request, with WWN as the address, to the host computer 120 and the external storage apparatus 100B.

At step S204, the host computer 120 and the external storage apparatus 100B with a WWN receives the existence confirmation request, and, at step S205, returns a response to the external storage apparatus 100A.

At step S206, the status monitoring program 115A confirms whether there is a response from the host computer 120 and the external storage apparatus 100B within a predetermined time. When there was a response within a predetermined time (S206: YES), at step S207, the setting management program 112A registers the device name, type, WWN and installation site of the device that sent the response in the path management table 116A. When there was no response within a predetermined time (S206: NO), at step S208, the setting management program 112A does not register the device name, type, WWN and installation site of the device that did not send a response (if registration has already been made in the path monitor table 116A, such registration is deleted).

Here, an example of the path management table 116A registered with the setting management program 112A is shown in FIG. 3. As shown in FIG. 3, the path management table 116A includes a number column 1161, a device name column 1162, a type column 1163, a WWN column 1164, and an installation site column 1165. The number column 1161 stores numbers for number the information to be managed in the path management table 116A. The device name column 1162 stores device names such as a host computer, storage and so on. The type column 1163 stores the type of device such as a host computer or an external storage apparatus. The WWN column 1164 stores the WWN. The installation site column 1165 stores the installation site showing which server room the computer system 1 is installed.

For example, the number column 1161 "1" in the path management table 116A associates and stores each piece of information of "host computer 1" in the device name column 1162, "host computer" in the type column 1163, "0xAAB-BCCDD" in the WWN column 1164, and "server room 1" in the installation site column 1165.

As described above, the setting management program 112A and the status monitoring program 115A of the external storage apparatus 100A perform the registration processing of path information of the external storage apparatus 100A as well as the host computer 120 and the other external storage apparatus 100B in operation configuring the computer system 1.

Figure 4:
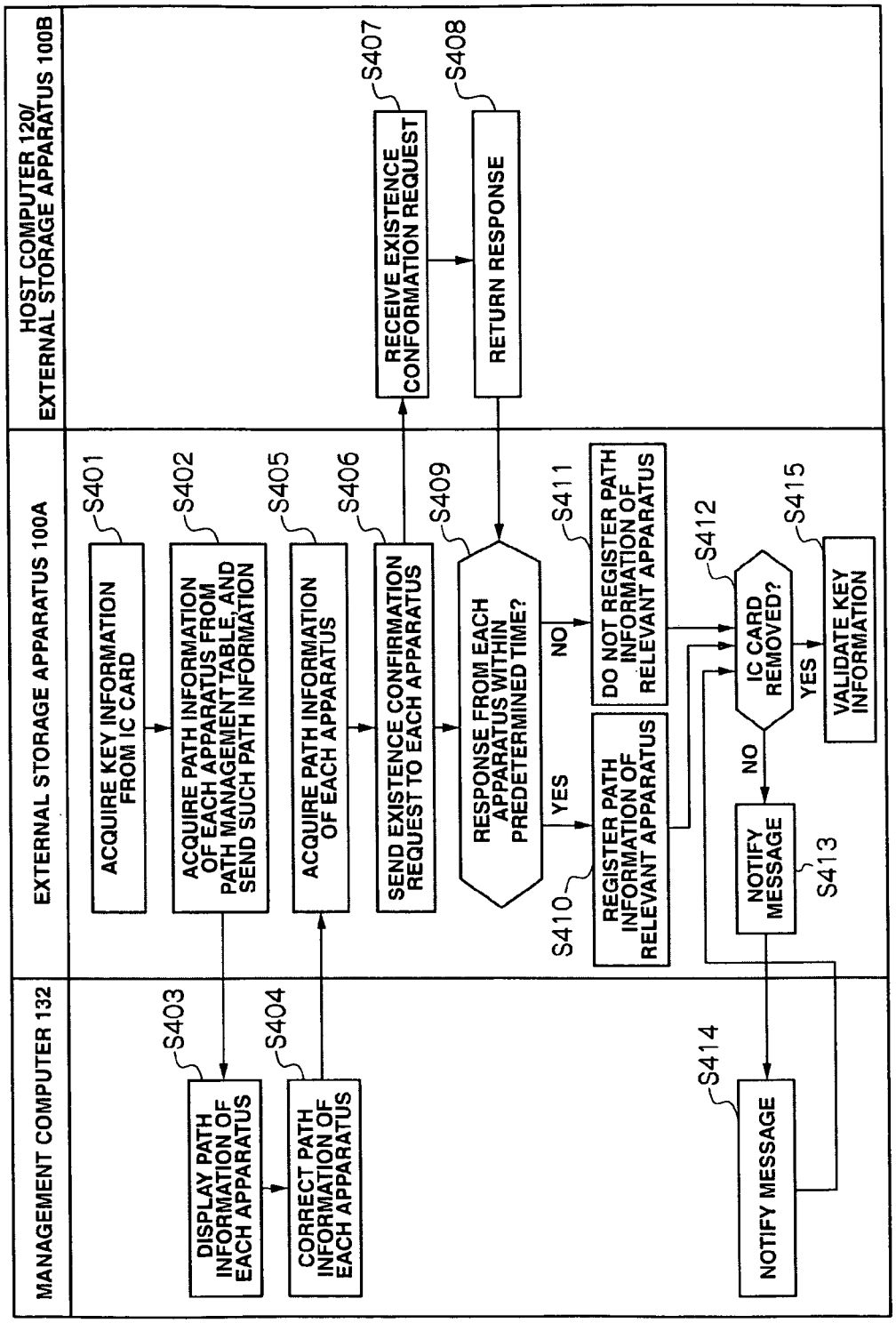
FIG. 4 is a flowchart showing the processing for registering the encryption key information to be performed in the external storage apparatus according to an embodiment of the present invention.

Subsequently, processing (2) of registering encryption key information to be used in the encryption calculation to be performed in the external storage apparatus 100A is explained with reference to FIG. 4. Registration of the encryption key information is performed when newly registering encryption key information, and when the encryption key is to recover the encryption key information based on foregoing processing (4). FIG. 4 is a flowchart showing the processing to be executed by the setting management program 112A, the key management program 114A and the status monitoring program 115A for registering the encryption key information.

At step S401, the administrator of the computer system 1 inserts the IC card 109A storing the encryption key information into the IC card reader/writer 104A of the external storage apparatus 100A. The key management program 113A of the external storage apparatus 100A acquires the encryption key information from the IC card 109A, and stores it in the key storage volatile memory 103A. However, the key management program 113A invalidates the foregoing encryption key information so it cannot be used. At step S402, the setting management program 112A acquires the path information of the respective devices such as the registered host computer 120 and the other external storage apparatus 100B from the path management table 116A, and sends the foregoing path information to the management computer 132.

At step S403, the management computer 132 receives the sent path information of the host computer 120 and the external storage apparatus 100B, and displays the foregoing path information to the administrator of the computer system. At step S404, the administrator of the computer system inputs corrections such as deletion, revision or addition of the path information of the host computer 120 and the external storage apparatus 100B as necessary according to the latest system configuration of the computer system 1. The management computer 132 sends the input path information of the host computer 120 and the external storage apparatus 100B to the external storage apparatus 100A.

At step S405, the setting management program 112A acquires the path information of the host computer 120 and the external storage apparatus 100B in the latest system configuration. At step S406, the status management program 115A of the external storage apparatus 100A sends an existence confirmation request, with the WWN of the path information as the address, to the host computer 120 and the external storage apparatus 100B.

At step S407, the host computer 120 and the external storage apparatus 100B with a WWN receive the existence confirmation request, and, at step S408, send a response to the external storage apparatus 100A.

At step S409, the status monitoring program 115A confirms whether there is a response from the host computer 120 and the external storage apparatus 100B within a predetermined time. When there was a response within a predetermined time (S409: YES), at step S410, the setting management program 112A registers the device name, type, WWN and installation site of the device that sent the response in the path management table 116A. When there was no response within a predetermined time (S409: NO), at step S411, the setting management program 112A does not register the device name, type, WWN and installation site of the device that did not send a response (if registration has already been made in the path monitor table 116A, such registration is deleted).

At step S412, the status monitoring program 115A confirms whether the IC card 109A has been removed from the IC card reader/writer 104A. When the IC card 109A has not been removed (S412: NO), at step S413, the setting management program 112A notifies a message to the management computer 132 to remove the IC card 109A.

At step S414, the management computer 132 displays a message to remove the IC card 109A to the administrator of the computer system 1. The processing at step S412 is repeated until the IC card 109 is removed from the IC card reader/writer 104A.

When the IC card 109A has been removed (S412: YES), at step S415, the key management program 113A validates the encryption key information stored in the key storage volatile memory 103A so that it can be used for encryption calculation.

As described above, the setting management program 112A, the key management program 114A and the status monitoring program 115A of the external storage apparatus 100A perform the registration processing of the encryption key information to be used in the encryption calculation. Here, in order to validate the encryption key information and correctly perform the encryption calculation of data to be stored in the storage area 106A in the external storage apparatus 100A, the IC card 109A must be removed from the external storage apparatus 100A. Thus, even if the external storage apparatus 100A is stolen, it is possible to prevent the IC card 109A from being stolen together.

Further, as described later, even in a case when the encryption key information of the external storage apparatus 100A is zeroized based on a legitimate change in the system configuration of the computer system 1 and the encryption key for restoration is registered, the path management table 116A will also be updated to its latest state according to the registration of the encryption key information. Thus, it is possible to prevent the encryption key information from being zeroized once again with the path information of the respective devices before the change of the computer system 1.

Figure 5:
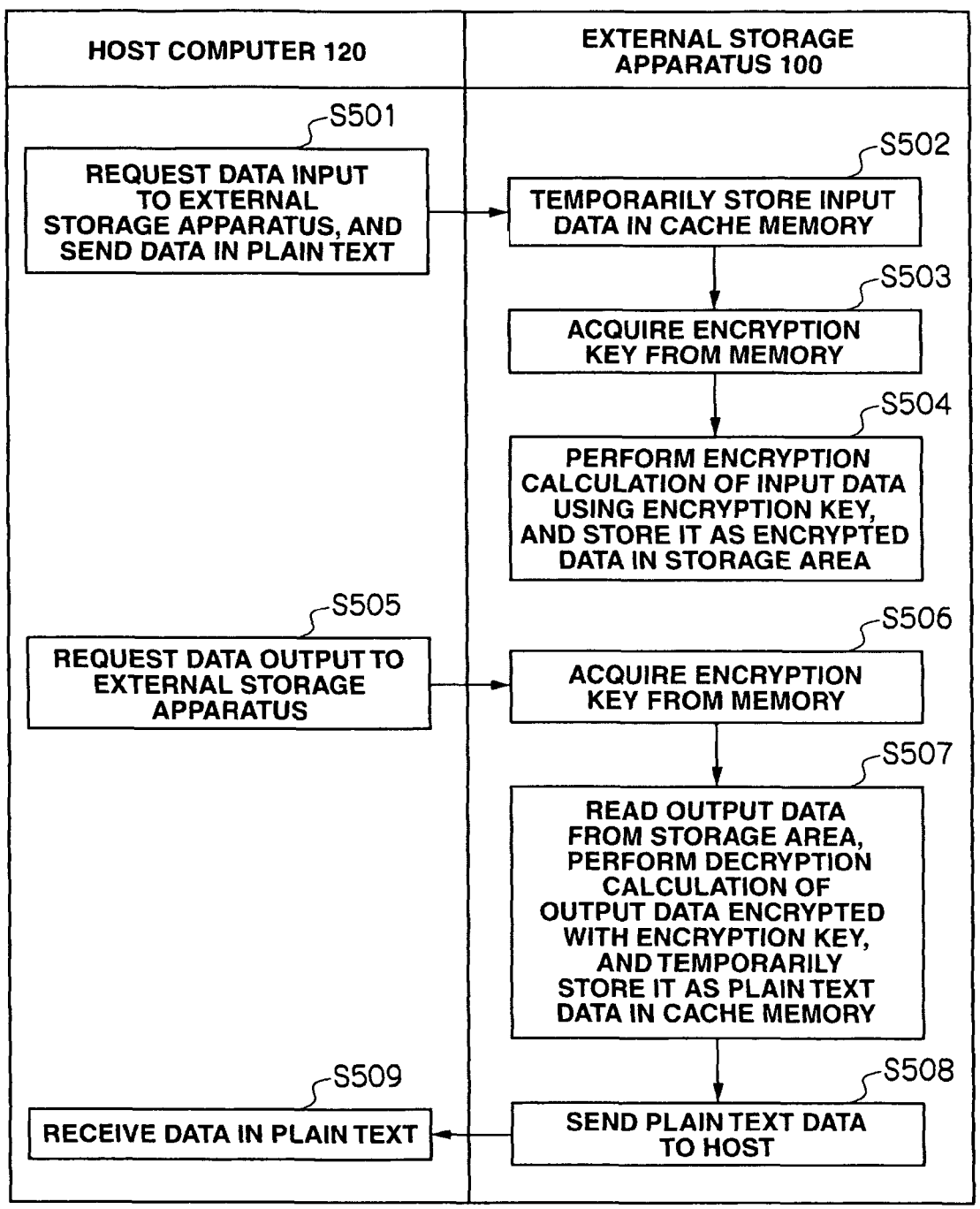
FIG. 5 is a flowchart showing the processing for calculating the encryption/decryption of data to be performed in the external storage apparatus according to an embodiment of the present invention.

Subsequently, processing (3) of calculating the encryption/decryption of data stored in the storage area 106 to be performed in the external storage apparatus 100 is explained with reference to FIG. 5. FIG. 5 is a flowchart showing the processing to be executed by the control program 111 and the encryption calculation program 113 for performing encryption calculation.

Foremost, the data encryption calculation processing of the external storage apparatus 100 when a data input request is sent from the host computer 120 is explained. At step S501, the host computer 120 sends a data input request to the external storage apparatus 100 and sends data in plain text.

At step S502, the control program 111 of the external storage apparatus 100 receives the plain text data, and temporarily stores this in the cache memory 102. At step S503, the encryption calculation program 113 of the external storage apparatus 100 acquires the encryption key from the volatile memory 103. At step S504, the control program 111 acquires the plain text data from the cache memory 102, and the encryption calculation program 113 performs the encryption calculation of the plain text data using the encryption key. The control program 111 thereafter stores the encrypted data in the storage area 106.

The data decryption calculation processing of the external storage apparatus 100 when a data output request is sent from the host computer 120 is explained. At step S505, the host computer 120 sends a data output request to the external storage apparatus 100.

At step S506, the encryption calculation program 113 acquires the encryption key from the key storage volatile memory 103. At step S507, the control program 111 acquires the encryption data requested to be output from the storage area 106, and the encryption calculation program 113 uses the encryption key to perform decryption calculation of the encryption data. The control program 111 thereafter temporarily stores the decrypted data in the cache memory 102. At step S508, the control program 111 sends data in the cache memory 102 in plain text to the host computer 120.

At step S509, the host computer 120 acquires the data requested to be output in plain text.

As described above, the control program 111 and the encryption calculation program 113 performs the processing for calculating the encryption/decryption of data stored in the storage area 106. Thereby, all data input from the host computer 120 will be encrypted and stored in the external storage apparatus 100, and, without the encryption key, the stored data will never be externally output as plain text data from the external storage apparatus 100.

Subsequently, processing (4) of zeroizing the encryption key upon detecting an abnormal status to be performed in the external storage apparatus 100 is explained with reference to FIG. 6 to FIG. 10. In the embodiment of the present invention, the following cases of (i) to (v) are considered to be abnormal statuses in which the encryption key should be zeroized.

(i) When the power source of the external storage apparatus 100 is cut off;

(ii) When a predetermined period of time has lapsed from the previous registration of the encryption key of the external storage apparatus 100;

(iii) When the system configuration of the computer system has been changed;

(iv) When an unauthorized host computer sends a data I/O request to the external storage apparatus 100; and (v) When the encryption key is zeroized in the other external storage apparatus 100.

Detection of abnormal statuses in cases (i) to (v) and the zeroization processing of the encryption key are now explained.

Foremost, the zeroization processing of the encryption key when the power source of the external storage apparatus 100A is cut off in case (i) is explained. Let it be assumed that the key storage volatile memory 103A for temporarily storing the encryption key in the external storage apparatus 100A operates by being supplied power from an external power source (not shown). When the power source is cut off due to the power source switch (not shown) or the power source cord (not shown) of the external storage apparatus 100A being turned OFF or cut, power supply to the key storage volatile memory 103A will be discontinued. As a result, the encryption key information temporarily stored in the key storage volatile memory 103A will be cleared.

As described above, when the power source of the external storage apparatus 100A is cut off, the encryption key is zeroized. Thereby, even when the external storage apparatus 100A stolen and carried outside, the power source of the external storage apparatus 100A will be cut off as a result of the external storage apparatus 100A being stolen and carried outside. As a result, the encryption key is zeroized, and the encrypted data stored in the external storage apparatus 100A can no longer be decrypted and extracted, and the leakage of information can be prevented thereby.

Subsequently, the zeroization processing of the encryption key when a predetermined period of time has lapsed from the previous registration of the encryption key of the external storage apparatus 100 in case (ii) is explained. The key management program 114A of the external storage apparatus 100A stores the time the encryption key was previous registered with foregoing processing (2) in a nonvolatile memory such as the storage area 106A. When a predetermined period of time set in advance has lapsed from the time the encryption key was previously registered, the key management program 114A clears the encryption key information temporarily stored in the key storage volatile memory 103A.

As described above, the encryption key is zeroized when a predetermined period of time has lapsed from the previous registration of the encryption key of the external storage apparatus 100. Here, if the foregoing predetermined period of time set in advance is set short, even assuming that the external storage apparatus 100A is stolen by a thief, a predetermined period of time will lapse and the encryption key will be zeroized before the thief can extract data from the external storage apparatus 100A. Thus, the encrypted data stored in the external storage apparatus 100A can no longer be decrypted and extracted, and the leakage of information can be prevented thereby.

Further, with the external storage apparatus 100A, if the encryption key is re-registered immediately before the lapse of a predetermined period of time from the previous registration of the encryption key, the period up to the zeroization of the encryption key will be extended. Thus, if the encryption key is periodically re-registered before the lapse of a predetermined period of time, the encryption key will no longer be zeroized, and it will be possible to constantly respond to the data I/O request from the host computer 120 without having to stop its processing.

Figure 6:
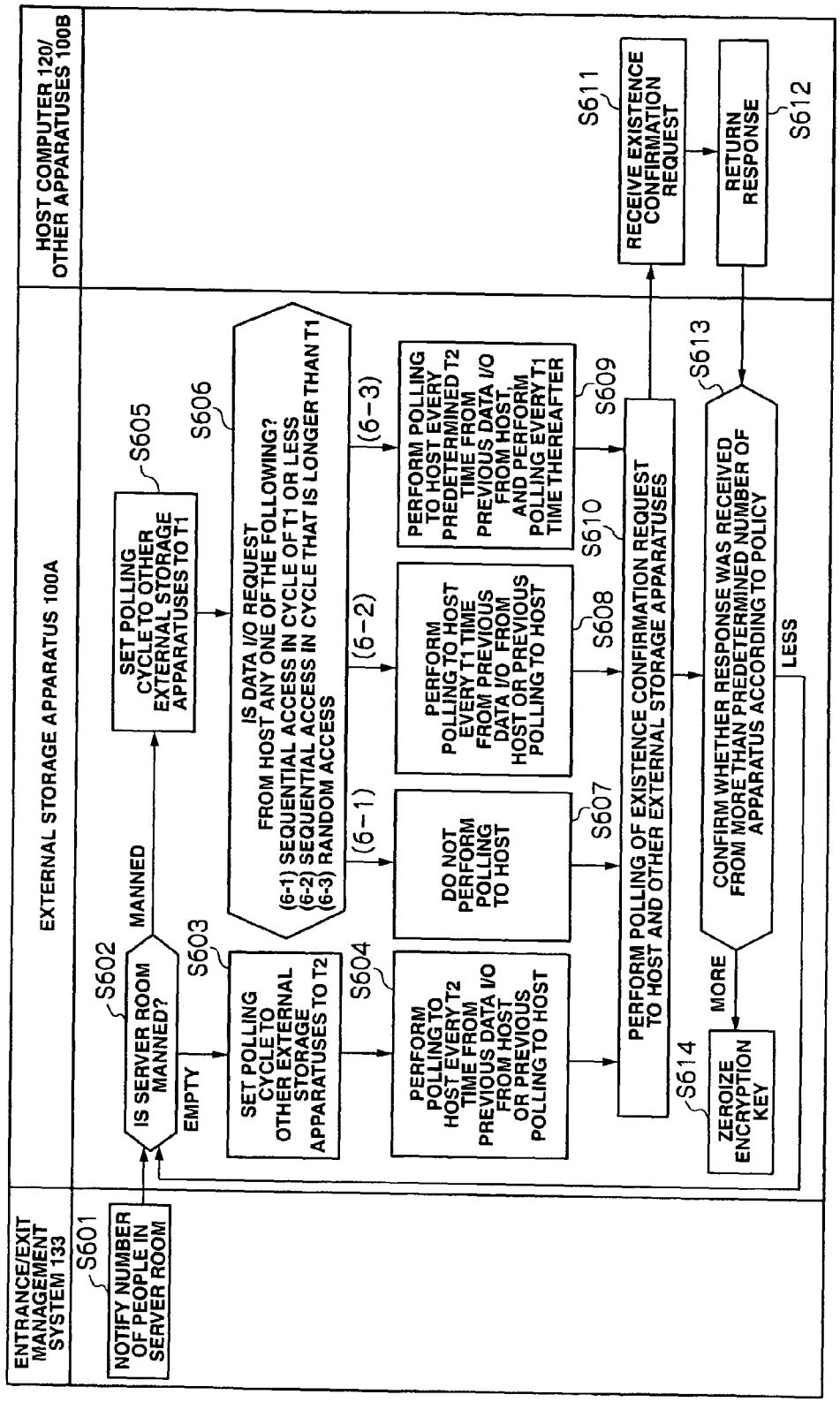
FIG. 6 is a flowchart showing the detection method when the system configuration of the computer system is changed and zeroization processing of the encryption key to be performed in the external storage apparatus according to an embodiment of the present invention.
Figure 7:
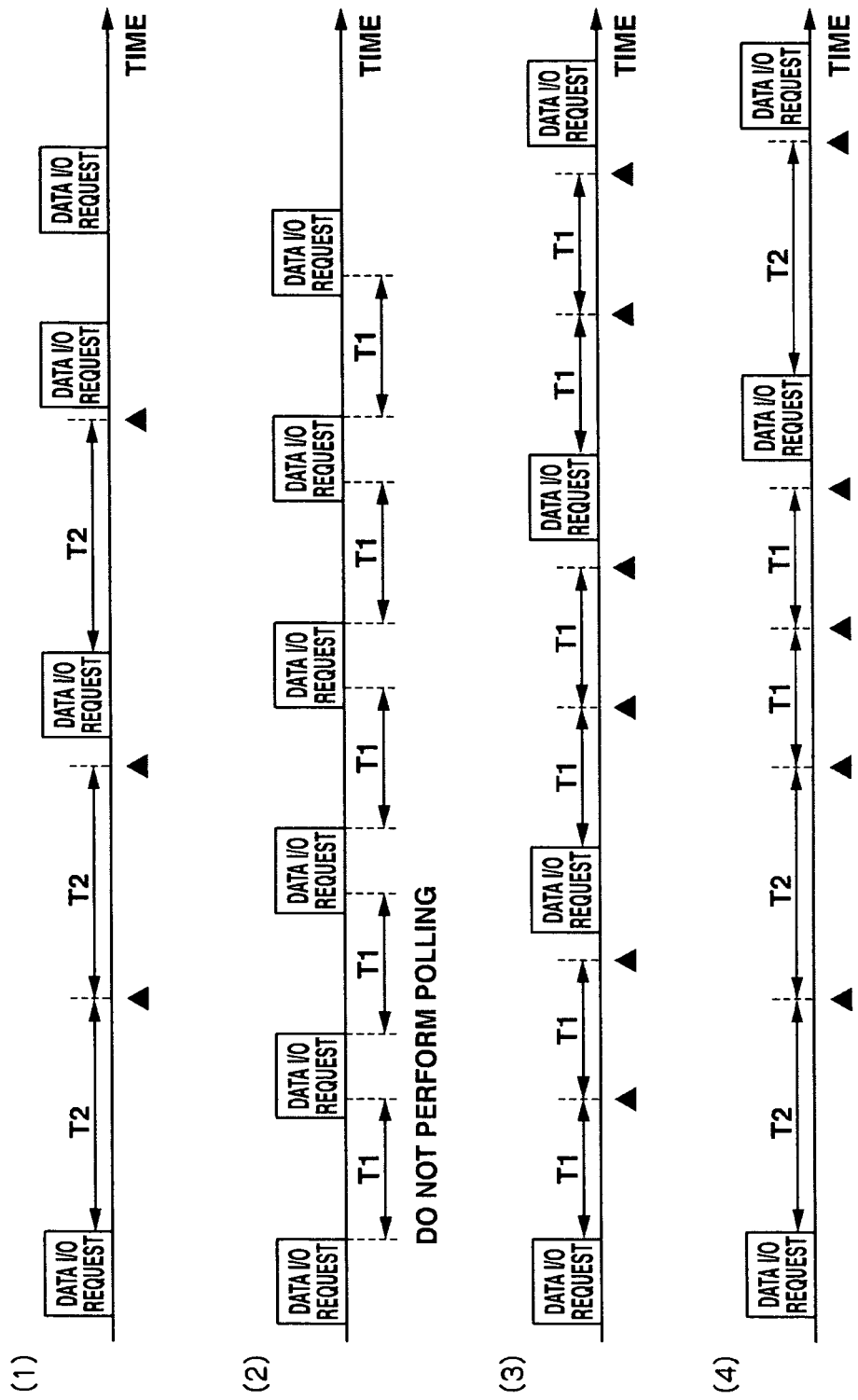
FIG. 7 is diagram showing an example of executing polling to a host computer to be performed in the external storage apparatus according to an embodiment of the present invention.

Subsequently, the method of detecting changes in the system configuration of the computer system and the zeroization processing of the encryption key in case (iii) are explained with reference to FIG. 6. FIG. 6 is a flowchart showing the processing to be executed by the setting management program 112A, the key management program 114A and the status monitoring program 115A for detecting changed in the system configuration of the computer system 1 and zeroizing the encryption key.

Here, as described later, the existence confirmation request will be subject to polling from the external storage apparatus 100A to the host computer 120 and the other external storage apparatus 100B, and let it be assumed that a polling cycle T1 of a standard interval and a polling cycle T2 of a longer interval as the polling cycles have been pre-set by the administrator of the computer system.

At step S601, when a person enters or exits the server room, the entrance/exit management system 133 notifies the total number of people in the server room to the external storage apparatus 100A.

At step S602, the setting management program 112A of the external storage apparatus 100A acquires the total number of people in the server room, and confirms whether the server room is manned. If the server room is empty (S602: Empty), at step S603, the setting management program 112A acquires the path information (device name, type, WWN, installation site) of the respective devices such as the registered host computer 120 and the other external storage apparatus 100B from the path management table 116A, and sets the cycle of polling the existence confirmation request to the other external storage apparatus 100B to T2. At step S604, the setting management program 112A sets the polling cycle so that the polling of the existence confirmation request to the host computer 120 will be performed every lapse of T2 from the time an I/O request was previously sent from the host computer 120 or from the time polling was previously performed to the host computer 120. Here, FIG. 7(1) shows an example of executing polling to the host computer 120 according to the polling cycle set at step S604.

When the server room is manned (S602: Manned), at step S605, the setting management program 112A acquires the path information of the respective devices such as the registered host computer and the other external storage apparatus from the path management table 116A, and sets the cycle of polling the existence confirmation request to the other external storage apparatus 100B to T1. At step S606, the setting management program 112A stores the time that a data I/O request was sent from the host computer 120 to the external storage apparatus 100A within a past predetermined period of time, and determines which one of the following corresponds to the data I/O request from the host computer 120 based on the interval that the data I/O request was sent.

(6-1) Sequential access of a cycle of T1 or less;
(6-2) Sequential access of a cycle that is longer than T1; or
(6-3) Random access.

When the data I/O request from the host computer 120 is the case of (6-1), at step S607, the setting management program 112A configures the setting so that the polling of the existence confirmation request to the host computer 120 is not performed. Here, FIG. 7(2) shows an example of executing the polling to the host computer 120 according to the polling cycle set at step S607.

When the data I/O request from the host computer 120 is the case of (6-2), at step S608, the setting management program 112A sets the polling cycle so that the polling of the existence confirmation request to the host computer 120 is performed every T1 from the time an I/O request was previously sent from the host computer 120 or from the time polling was previously performed to the host computer 120. Here, FIG. 7(3) shows an example of executing polling to the host computer 120 according to the polling cycle set at step S608.

When the data I/O request from the host computer 120 is the case of (6-3), at step S609, the setting management program 112A sets the polling cycle so that the polling of the existence confirmation request to the host computer 120 is performed every lapse of T2 for a predetermined number of times from the time an I/O request was previously sent from the host computer 120, and performed every lapse of T1 thereafter. Here, FIG. 7(4) shows an example of executing polling to the host computer 120 according to the polling cycle set at step S609. Incidentally, in the example of FIG. 7(4), the predetermined number of times polling is to be performed for the lapse of the initial T2 is twice.

Here, when a plurality of host computers 120A, 120B are connected inside the computer system 1, the processing at step S604 and S606 to S609 will be applicable to each host computer 120A, 120B. In other words, the polling cycle will be set to each host computer 120A, 120B.

Subsequently, at step S610, the status management program 115A of the external storage apparatus 100A performs polling of the existence confirmation request according to the polling cycle set above to the respective devices such as the host computer 120 and the other external storage apparatus 100B.

At step S611, the host computer 120 and the external storage apparatus 100B receive the existence confirmation request, and, at step S612, return a response.

At step S613, the status monitoring program 115A confirms whether there is a response from the host computer 120 and the external storage apparatus 100B within a predetermined time. The status monitoring program 115A thereafter refers to the policy selected as the valid policy in the policy table 117A, proceeds to step S614 when there is no response within a predetermined time from more than the number of devices prescribed in the policy, and returns to step S601 in the contrary case, and repeats subsequent steps S602 to S613. At step S614, the key management program 114A clears the encryption key information temporarily stored in the key storage volatile memory 103A.

Here, FIG. 10 shows an example of the policy table 117A. As shown in FIG. 10, the policy table 117A includes a number column 1171, a policy column 1172, and a validity setting column 1174. The number column 1171 stores numbers for numbering the information to be managed in the policy table 117A. The policy column 1172 prescribes the number of devices that do not return a response within the predetermined time as the precondition for zeroizing the encryption key. The validity setting column 1173 sets which policy is valid and which policy is invalid. A valid policy is indicated with "∘" and an invalid policy is indicated with "x."

For instance, in correspondence to the number column 1171 "1" in the policy table 117A, the policy column 1172 is set with "ZEROIZE KEY OF EXTERNAL STORAGE APPARATUS WHEN RESPONSE TO EXISTENCE CONFIRMATION IS NOT RETURNED FROM AT LEAST ONE HOST COMPUTER OR EXTERNAL STORAGE APPARATUS. WHEN ZEROIZING KEY OF SELF-EXTERNAL STORAGE APPARATUS, ZEROIZE KEYS OF ALL OTHER EXTERNAL STORAGE APPARATUSES," and "∘" is set in the validity setting column 1173.

In the example of FIG. 10, since policy #1 is selected as the valid policy, the encryption key is zeroized when there is no response from at least one or more devices. The new registration of a policy in the policy table 117A or the selection of a valid policy is conducted by the administrator using the management computer 132 to set the contents, and the setting management program 112A reflecting the set contents in the policy table 117A.

If the environment is such that the disconnection/connection of the path between the host computer 120 and the external storage apparatus 100B is conducted frequently, in the example of FIG. 10, by selecting policy #3 or policy #4 of "ZEROIZE KEY OF EXTERNAL STORAGE APPARATUS WHEN RESPONSE TO EXISTENCE CONFIRMATION IS NOT RETURNED FROM AT LEAST TWO OR MORE DEVICES (OR MORE)," it is possible to prevent the encryption key from being zeroized unnecessarily.

As described above, the change in the system configuration of the computer system 1 is detected, and the encryption key is zeroized. Thereby, even when the external storage apparatus 100A is stolen and carried outside, change in the system configuration of the computer system 1 is detected. As a result, the encryption key is zeroized, and the encrypted data stored in the external storage apparatus 100A can no longer be decrypted and extracted, and the leakage of information can be prevented thereby.

Further, in the embodiment of the present invention, although polling is performed to the host computer 120 and the other external storage apparatus 100B for detecting changes in the system configuration of the computer system 1, since the polling cycle to the host computer 120 and the other external storage apparatus 100B is dynamically changed based on the following concept, polling can be effectively executed with a low network load.

In other words, since the possibility of theft is low when the server room is empty, the polling cycle to the host computer 120 and the other external storage apparatus 100B is extended. Further, when sequential access is being made from the host computer 120 to the external storage apparatus 100A at a cycle that is lower than the standard cycle T1, since it is likely that the foregoing sequential access fail even if the external storage apparatus 100A is stolen and the administrator will notice the theft, polling to the host computer 120 is not performed. Further, when sequential access is being made from the host computer 120 to the external storage apparatus 100A at a cycle that is longer than the standard cycle T1, polling is performed to the host computer 120 so as to compensate the interval of such sequential access. Moreover, when random access is being made from the host computer 120 to the external storage apparatus 100A, since the access from the host computer 120 could be repeatedly immediately, the polling cycle to the host computer 120 is extended initially, and then the polling cycle is shortened if the state with no access continues for a while.

Here, at steps S603 and S604, although the polling cycle is set to the host computer 120 and the other external storage apparatus 100B when the server room is empty, the setting may be configured so that polling is not performed when it is possible to guarantee that the external storage apparatus 100 will not be stolen from an empty server room.

Further, at step S607, although the setting is configured such that polling is not performed to the host computer 120, when there is a possibility that the host computer 120 fails in the sequential access and the thief will steal the external storage apparatus 100 even if the administrator notices the theft of the external storage apparatus 100, polling to the host computer 120 may be set such that the encryption key is zeroized when the polling ends in a failure.

Figure 8:
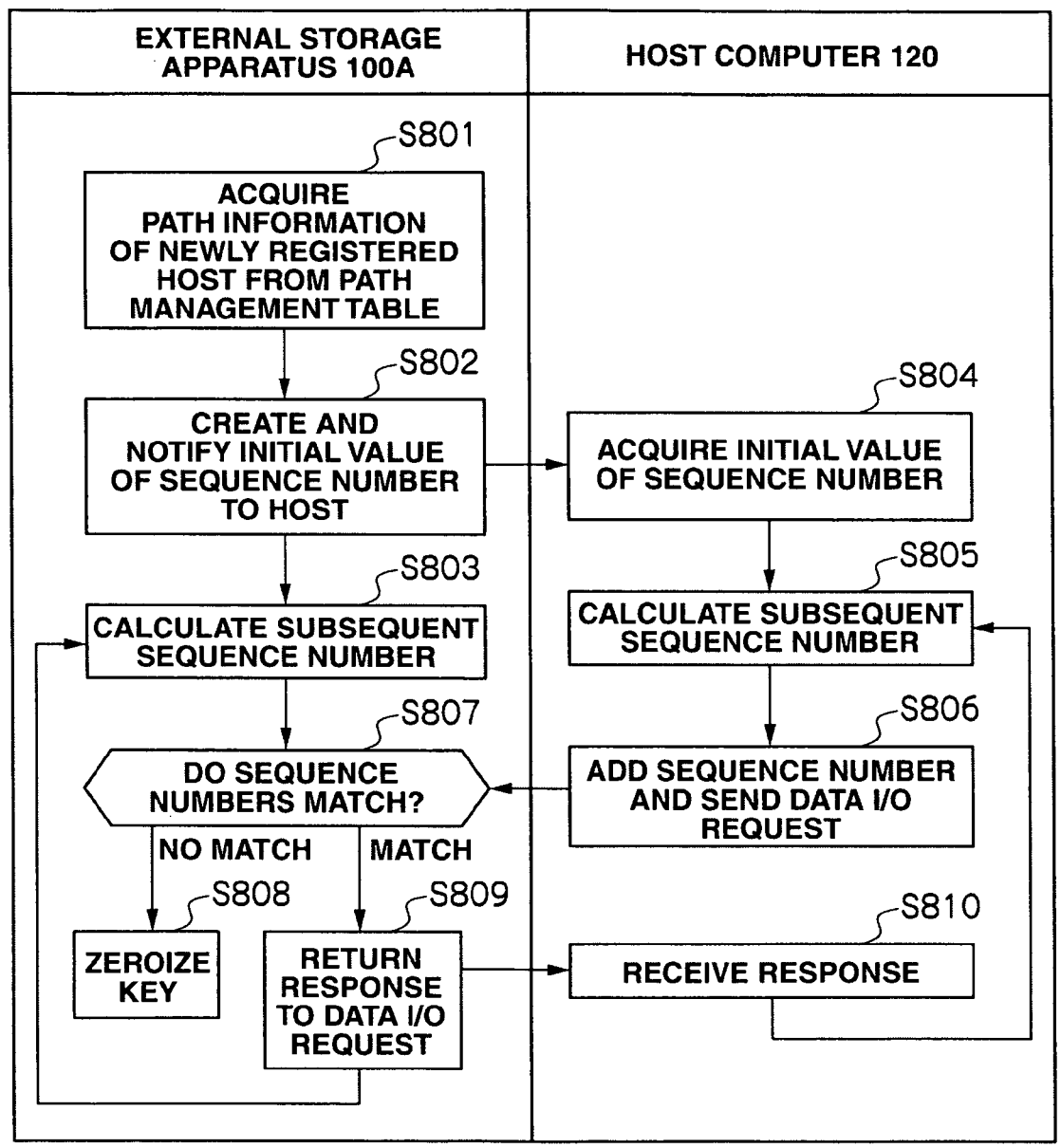
FIG. 8 is a flowchart showing the detection method when a data I/O request is issued from an unauthorized host computer and zeroization processing of the encryption key to be performed in the external storage apparatus according to an embodiment of the present invention.

Subsequently, the method of detecting a data I/O request being sent from an unauthorized host computer to the external storage apparatus 100A and the zeroization processing of the encryption key in case (iv) is now explained with reference to FIG. 8. FIG. 8 is a flowchart showing the processing to be executed by the control program 111A, the setting management program 112A, the key management program 114A and the status monitoring program 115A for detecting that a data I/O request was sent from an unauthorized host computer and zeroizing he encryption key.

At step S801, the setting management program 112A of the external storage apparatus 100A acquires path information (device name, type, WWN and installation site) of the host computer 120 newly registered in the computer system 1 from the path management table 116A. At step S802, the status monitoring program 115A of the external storage apparatus 100A creates a default value of a unique sequence number with random numbers to the host computer 120, and notifies this default value to the host computer 120. At step S803, the status monitoring program 115A computes the subsequent sequence number from the previous sequence number based on a prescribed calculation formula.

Here, as the calculation formula of the sequence number, the following calculation formula based on a hash function such as SHA (Secure Hash Algorithm) 1 or MD5 (Message Digest Algorithm 5) may be used.

Sequence number of $n^{th}+1$=hash function (character string combining $n^{th}$ sequence number+default value)

At step S804, the host computer 120 acquires the default value of the sequence number. At step S805, the driver program 121 of the host computer 120 computes the subsequent sequence number from the previous sequence number based on a prescribed calculation formula. Here, the driver program 121 shall use the same calculation formula used by the status monitoring program 115A. Thus, since the same default value and calculation formula are used, it is guaranteed that the sequence number computed by the status monitoring program 115A and the sequence number computed by the driver program 121 will always be the same value. Further, when a plurality of host computers 120A, 120B are connected in the computer system 1, the status monitoring program 115A of the external storage apparatus 100A creates a default value of different sequence numbers to each host computer 120A, 120B, and notifies such default value to each host computer 120A, 120B. Since the calculation formula to be used in computing the sequence number will be a calculation formula based on the hash function, the possibility that the same sequence number will collide in each host computer 120A, 120B is extremely low.

Subsequently, at step S806, the host computer 120 sends a data I/O request upon adding the computed sequence number when sending such data I/O request to the external storage apparatus 100A.

At step S807, the external storage apparatus 100A receives the data I/O request and the sequence number from the host computer 120, and the status monitoring program 115A confirms whether the sequence number that it personally computed and the sequence number sent form the host computer 120 match. When the sequence numbers do not match (S807: No Match), at step S808, the key management program 114A of the external storage apparatus 100A clears the encryption key information temporarily stored in the key storage volatile memory 103A; in other words, it zeroizes the encryption key. When the sequence numbers match (S807: Match), at step S809, the control program 111A performs prescribed data I/O processing according to the data I/O request from the host computer 120, and returns a response to the host computer 120. After returning the response, the process proceeds to step S803, and the status monitoring program 115A computes the subsequent sequence number.

At step S810, the host computer 120 receives the response from the external storage apparatus 100A. The routine then proceeds to step S805, and the driver program 121 computes the subsequent sequence number.

As described above, the sending of a data I/O request from an unauthorized host computer is detected, and the encryption key is zeroized. Thereby, in a state where the external storage apparatus 100A is not stolen and still connected to the computer system 1, since the encryption key is zeroized even in a case where the acquisition of data of the external storage apparatus 100A is attempted from the unauthorized host computer, the encrypted data stored in the external storage apparatus 100A can no longer be decrypted and extracted, and the leakage of information can be prevented thereby.

Figure 9:
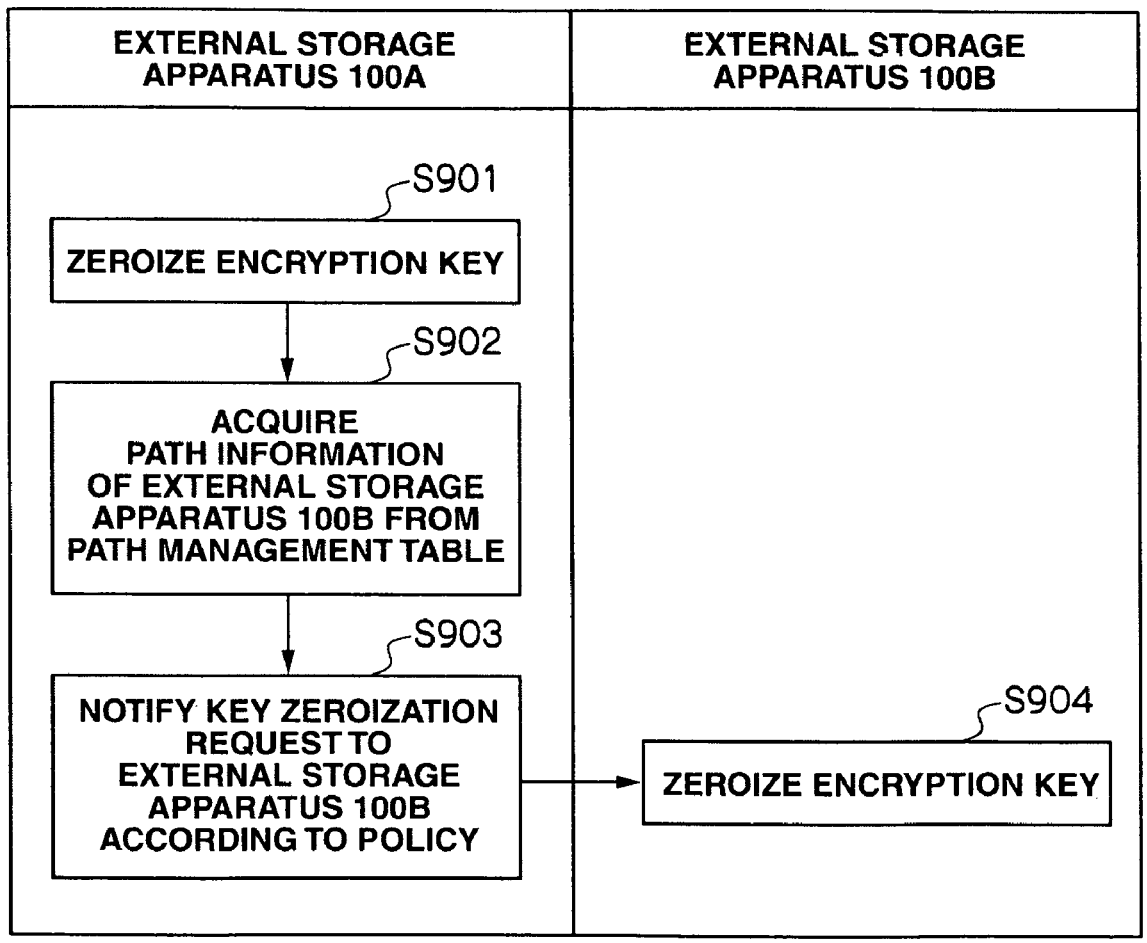
FIG. 9 is a flowchart showing the detection method when a data I/O request is issued from an unauthorized host computer and zeroization processing of the encryption key to be performed in the external storage apparatus according to an embodiment of the present invention.

Subsequently, the zeroization processing of the encryption key of the other external storage apparatus 100 when an encryption key is zeroized in a certain external storage apparatus in case (v) is explained with reference to FIG. 9. FIG. 9 is a flowchart showing the processing to be executed by the key management programs 114A, 114B and the setting management program 112A for zeroizing the encryption key of the external storage apparatus 100B in coordination with the zeroization of the encryption key in the other external storage apparatus 100A.

At step S901, due to reasons (ii), (iii) and (iv) above, the key management program 114A of the external storage apparatus 100A clears the encryption key information temporarily stored in the key storage volatile memory 103A. At step S902, the setting management program 112A acquires path information (device name, type, WWN and installation site) of the registered other external storage apparatus 100B from the path management table 116A. At step S903, the key management program 114A of the external storage apparatus 100A refers to the policy set as the valid policy in the policy table 117A, and notifies an encryption key zeroization request to all external storage apparatuses within the range prescribed in the policy.

Here, in the policy table 117A shown in FIG. 10, the range of the other external storage apparatuses 100B in which the encryption key is to be zeroized in coordination with the zeroization of the encryption key of the external storage apparatus 100B is prescribed. In the example shown in FIG. 10, as described above, "○" is set in the validity setting column 1173 corresponding to the number column 1171 "1." Thus, including the external storage apparatus 100B, the foregoing notice is sent to all external storage apparatuses 100B registered in the path management table 116A.

At step S904, the key management program 114B of the external storage apparatus 100B acquires the foregoing encryption key zeroization request, and clears the encryption key information temporarily stored in the volatile memory 103B.

As described above, even when the encryption key of a certain external storage apparatus 100A is zeroized, and the risk of information being leaked from the other external storage apparatus 100B increases, since the encryption key of the external storage apparatus 100B will be coordinately zeroized, the encrypted data stored in the external storage apparatus 100B can no longer be decrypted and extracted, and the leakage of information can be prevented thereby.

Here, if the computer system 1 is configured by another external storage apparatus (not shown) being installed at a remote site that is different from the installation site of the external storage apparatus 100A, even if the key of the external storage apparatus 100A is zeroized, it is unlikely that the danger of information leakage will spread to the other external storage apparatus installed at the remote site.

Here, in the example of the policy table 117A shown in FIG. 10, for instance, by validating the validity setting column 173 of the policy of "ONLY ZEROIZE KEYS OF ALL OTHER EXTERNAL STORAGE APPARATUSES INSTALLED AT THE SAME SITE" associated with number column 1171 "#2" and "#4", the encryption key of the external storage apparatus installed at a safe remote site will not be zeroized, and it will be possible to prevent the encryption key from being zeroized unnecessarily.

Further, when the storage area of the external storage apparatus 100A and the storage area of the external storage apparatus installed at a remote site are configuring a pair volume, after the external storage apparatus 100A zeroizes the key, the setting management program 112A of the external storage apparatus 100A switches the path so that the destination of the host computer 120 connected to the volume of the external storage apparatus 100A will become the pair volume destination of the external storage apparatus at the remote site. Thereby, processing in response to the data I/O request from the host computer 120 will be succeeded by the external storage apparatus at the remote site, and it will be possible to continue the operation of the host computer 120 without interruption.

As described above, according to the embodiment of the present invention, with the computer system 1 configured from a host computer, an external storage apparatus and so on, it is possible to prevent the leakage of information from an external storage apparatus even when such external storage apparatus is stolen or accessed from an unauthorized host computer in a computer system configured from a host computer and an external storage apparatus or the like.

Incidentally, the external storage apparatus 100A accessible from the host computers 120A, 120B or the external storage apparatus 100B as the other external storage apparatus via the LAN 134 as a network encrypts and decrypts data written, for example, from the host computer 120A to be stored in the storage area 106A. The encryption calculation of such encryption and decryption is conducted using an encryption key stored in the key storage volatile memory 103A as described above. When the supply of the external power source is cut off, the encryption key stored in the key storage volatile memory 103A of the external storage apparatus 100A is zeroized. As a result of the encryption key being zeroized as described above, in substitute for a configuring that prevents the information leakage of data stored in the storage area 106A, for instance, the configuration may also be such that when the CPU 101A detects that the supply of the external power source has been cut off, the encryption key stored in the key storage volatile memory 103A is zeroized. In other words, in this configuration, the external storage apparatus 100A of the computer system 1 will comprise the step of encrypting and decrypting data written from the host computer 100A to be stored in the storage area 106A, and the step of zeroizing the encryption key stored in the key storage volatile memory 103A storing the encryption key to be used in the encryption calculation of encryption and decryption when the supply of the external power source is cut off. As a result of configuring the computer system 1 as described above, for example, even in a configuration where the key storage volatile memory 103A is temporarily backed up with the backup power source in the external storage apparatus 100A, it will still be possible to prevent the information leakage of data stored in the storage area 106A.

The present invention can be broadly applied to various types of external storage apparatuses.

We claim:

1. An external storage apparatus accessible from a host computer or another external storage apparatus via a network, comprising:
    a storage area for storing data written from a host computer;
    an encryption calculation unit for encrypting or decrypting data stored in said storage area;
    a transmission unit for sending a request for existence confirmation to said host computer or said other external storage apparatus every predetermined period of time, wherein said transmission unit sends said request based on a difference of whether a timing of a data I/O request from said host computer is a sequential access or a random access; and a key management unit for zeroizing an encryption key to be used in said encryption calculation for encrypting or decrypting data to be performed by said encryption calculation unit based on the result of a response from said host computer or said other external storage apparatus in reply to said request.

2. The external storage apparatus according to claim 1, wherein, when the timing of said data I/O request from said host computer is a random access, said transmission unit shortens the predetermined period of time for sending said request.

3. The external storage apparatus according to claim 1, wherein, when said encryption key is zeroized, said key management unit sends information for zeroizing an encryption key in another external storage apparatus to said other external storage apparatus.

4. The external storage apparatus according to claim 1, further comprising an acquisition unit for acquiring a number of people in an area to which said external storage apparatus is installed, and said transmission unit decides the timing of sending said request based on the number of people acquired with said acquisition unit.

5. An external storage apparatus accessible from a host computer or another external storage apparatus via a network, comprising:

a storage area for storing data written from a host computer;

an encryption calculation unit for encrypting or decrypting data stored in said storage area;

a computation unit for computing a sequence number corresponding to individual I/O requests from said host computer;

a verification unit for verifying the sequence number sent from said host computer and the sequence number computed with said computation unit;

a key management unit for zeroizing an encryption key to be used in said encryption calculation for encrypting or decrypting data when said sent sequence number and said computed sequence number do not match based on the verification result of said verification unit; and a transmission unit for sending a request for existence confirmation to said host computer or said other external storage apparatus every predetermined period of time, wherein said transmission unit sends said request based on a difference of whether a timing of a data I/O request from said host computer is a sequential access or a random access.

6. The external storage apparatus according to claim 5, wherein the sequence number corresponding to individual I/O requests from said host computer is configured from random numbers or character strings.

7. The external storage apparatus according to claim 5, wherein, said encryption key is zeroized, said key management unit sends information for zeroizing an encryption key in another external storage apparatus to said other external storage apparatus.

8. An external storage apparatus accessible from a host computer or another external storage apparatus via a network, comprising:

a storage area for storing data written from a host computer;

an encryption calculation unit for encrypting or decrypting data stored in said storage area;

a reader device for reading an encryption key from a storage medium storing said encryption key to be used in said encryption calculation for encrypting or decrypting data to be performed by said encryption calculation unit;

a controller for disallowing the use of said encryption key when said reader device is inserted into said storage medium; and a transmission unit for sending a request for existence confirmation to said host computer or said other external storage apparatus every predetermined period of time, wherein said transmission unit sends said request based on a difference of whether a timing of a data I/O request from said host computer is a sequential access or a random access.

9. An information leakage prevention method of an external storage apparatus accessible from a host computer or another external storage apparatus via a network, comprising:

a step for encrypting or decrypting data written from said host computer to be stored in a storage area;

a step for sending a request for existence confirmation to said host computer or said other external storage apparatus every predetermined period of time, wherein the predetermined period of time for sending said request is decided based on a difference of whether a timing of a data I/O request from said host computer is a sequential access or a random access; and a step for zeroizing an encryption key to be used in said encryption calculation for encrypting or decrypting data to be performed by said encryption calculation unit based on the result of a response from said host computer or said other external storage apparatus in reply to said request.

10. The information leakage prevention method of an external storage apparatus according to claim 9, wherein, at said sending step, when the timing of said data I/O request from said host computer is a random access, the predetermined period of time for sending said request is shortened.

11. The information leakage prevention method of an external storage apparatus according to claim 9, wherein, at said step for zeroizing said encryption key, when said encryption key is zeroized, information for zeroizing an encryption key in another external storage apparatus is sent to said other external storage apparatus.

12. The information leakage prevention method of an external storage apparatus according to claim 9, further comprising an acquisition step for acquiring a number of people in an area to which said external storage apparatus is installed, and at said sending step, the timing of sending said request is decided based on the number of people acquired at said acquisition step.

13. An information leakage prevention method of an external storage apparatus accessible from a host computer or another external storage apparatus via a network, comprising:

a step for encrypting or decrypting data written from said host computer to be stored in a storage area;

a step for computing a sequence number corresponding to individual I/O requests from said host computer;

a step for verifying the sequence number sent from said host computer and the sequence number computed with said computation unit;

a step for zeroizing an encryption key to be used in said encryption calculation for encrypting or decrypting data when said sent sequence number and said computed sequence number do not match based on the verification result of said verification unit; and a step for sending a request for existence confirmation to said host computer or said other external storage apparatus every predetermined period of time, wherein the predetermined period of time for sending said request is decided based on a difference of whether a timing of a data I/O request from said host computer is a sequential access or a random access.

14. The information leakage prevention method of an external storage apparatus according to claim 13, further comprising a step for sending information for zeroizing an encryption key in another external storage apparatus to said other external storage apparatus when said encryption key is zeroized at said step for zeroizing said encryption key.

15. The information leakage prevention method of an external storage apparatus according to claim 13, wherein the sequence number corresponding to individual I/O requests from said host computer is configured from random numbers or character strings.

16. An information leakage prevention method of an external storage apparatus accessible from a host computer or another external storage apparatus via a network, comprising:
- a step for storing data written from a host computer;
- a step for encrypting or decrypting data stored in said storage area;
- a step for reading an encryption key from a storage medium storing said encryption key to be used in said encryption calculation for encrypting or decrypting data to be used at said step for encrypting and decrypting data;
- a step for disallowing the use of said encryption key when said reader device is inserted into said storage medium at said reading step; and
- a step for sending a request for existence confirmation to said host computer or said other external storage apparatus every predetermined period of time, wherein the predetermined period of time for sending said request is decided based on a difference of whether a timing of a data I/O request from said host computer is a sequential access or a random access.

17. A storage system containing an external storage apparatus accessible from a host computer or another external storage apparatus via a network, comprising:
- a memory in the external storage apparatus;
- an encryption calculation unit in the memory of the external storage apparatus for encrypting or decrypting data written from said host computer to be stored in a storage area of said external storage apparatus;
- a transmission unit in the memory of the external storage apparatus for sending a request for existence confirmation from said external storage apparatus to said host computer or said other external storage apparatus every predetermined period of time, wherein said transmission unit sends said request based on a difference of whether a timing of a data I/O request from said host computer is a sequential access or a random access; and
- a key management unit in the memory of the external storage apparatus for zeroizing an encryption key to be used in said encryption calculation for encrypting or decrypting data to be performed by said encryption calculation unit based on the result of a response from said host computer or said other external storage apparatus in reply to said request.

18. The storage system according to claim 17, wherein, when the timing of said data I/O request from said host computer is a random access, said transmission unit shortens the predetermined period of time for sending said request.

19. The storage system according to claim 17, wherein, when said encryption key is zeroized, said key management unit sends information for zeroizing an encryption key in another external storage apparatus to said other external storage apparatus.

20. A storage system containing an external storage apparatus accessible from a host computer or another external storage apparatus via a network, comprising:
- a memory in the external storage apparatus;
- an encryption calculation unit in the memory of the external storage apparatus for encrypting or decrypting data written from said host computer to be stored in a storage area of said external storage apparatus;
- a verification unit in the memory of the external storage apparatus for verifying the sequence number sent from said host computer and the sequence number computed with said computation unit;
- a key management unit in the memory of the external storage apparatus for zeroizing an encryption key to be used in said encryption calculation for encrypting or decrypting data when said sent sequence number and said computed sequence number do not match based on the verification result of said verification unit; and
- a transmission unit in the memory of the external storage apparatus for sending a request for existence confirmation from said external storage apparatus to said host computer or said other external storage apparatus every predetermined period of time, wherein said transmission unit sends said request based on a difference of whether a timing of a data I/O request from said host computer is a sequential access or a random access.

* * * * *